US007587995B2

(12) United States Patent  
Kraft et al.

(10) Patent No.: US 7,587,995 B2
(45) Date of Patent: Sep. 15, 2009

(54) RADIANT SYNGAS COOLER

(75) Inventors: Dave L. Kraft, Canton, OH (US); Kiplin C. Alexander, Wadsworth, OH (US); Steven R. Fry, Uniontown, OH (US); Thomas E. Doyle, Louisville, OH (US); Melvin J. Albrecht, Homeworth, OH (US)

(73) Assignee: Babcock & Wilcox Power Generation Group, Inc., Barberton, OH (US)

( * ) Notice: Subject to any disclaimer, the term of this patent is extended or adjusted under 35 U.S.C. 154(b) by 14 days.

(21) Appl. No.: 11/588,045

(22) Filed: Oct. 26, 2006

(65) Prior Publication Data

US 2007/0119577 A1 May 31, 2007

(51) Int. Cl.
*C10J 3/76* (2006.01)

(52) U.S. Cl. .......................... 122/7 R; 48/67
(58) Field of Classification Search ................ 122/7 R, 122/470; 48/202, 203, 67, 87; 165/119, 165/157

See application file for complete search history.

(56) References Cited

U.S. PATENT DOCUMENTS

| 4,272,255 | A  | * | 6/1981  | Coates ............................. 48/63 |
| 4,478,608 | A  | * | 10/1984 | Dorling et al. ................. 48/210 |
| 4,513,694 | A  | * | 4/1985  | Wiemer ....................... 122/7 R |
| 4,768,470 | A  | * | 9/1988  | Ziegler ........................ 122/7 R |
| 5,233,943 | A  | * | 8/1993  | Martin et al. ................ 122/7 R |
| 5,713,312 | A  | * | 2/1998  | Waryasz ...................... 122/481 |
| 6,435,139 | B1 | * | 8/2002  | Brucher ....................... 122/7 R |
| 2007/0283907 | A1 | * | 12/2007 | Brinkmann et al. ......... 122/460 |
| 2008/0011247 | A1 | * | 1/2008  | Alexander ................... 122/7 D |

* cited by examiner

*Primary Examiner*—Gregory A Wilson
(74) *Attorney, Agent, or Firm*—Eric Marich

(57) ABSTRACT

A radiant syngas cooler used to contain and cool the synthesis gas produced by coal gasification processes employs radiant and convection surfaces in a specific arrangement to achieve a cost-effective, compact design.

30 Claims, 10 Drawing Sheets

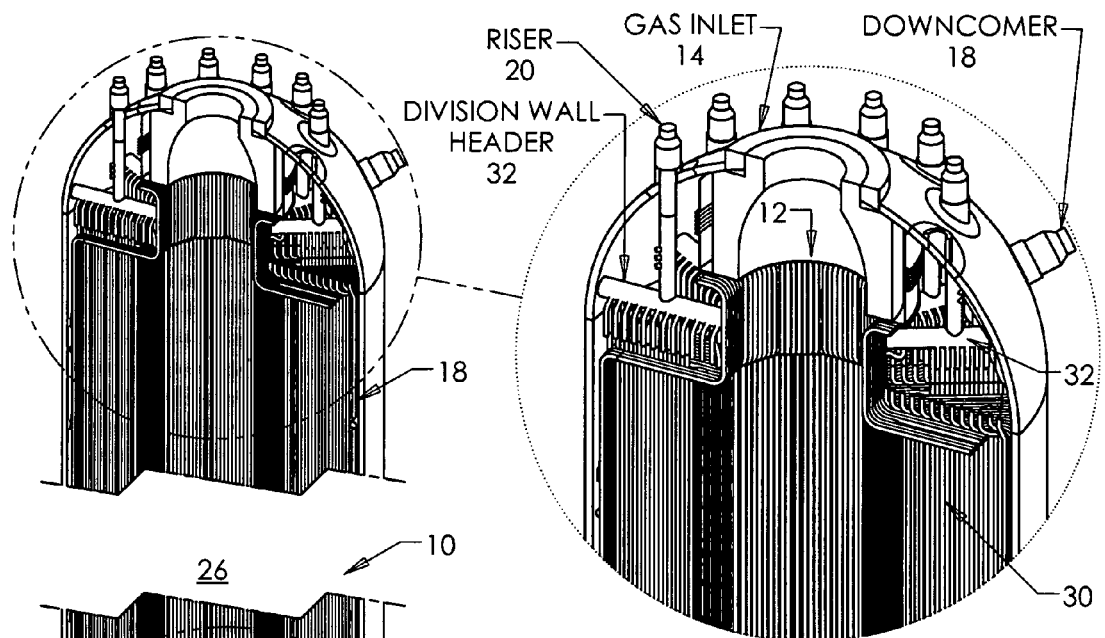
FIG. 4
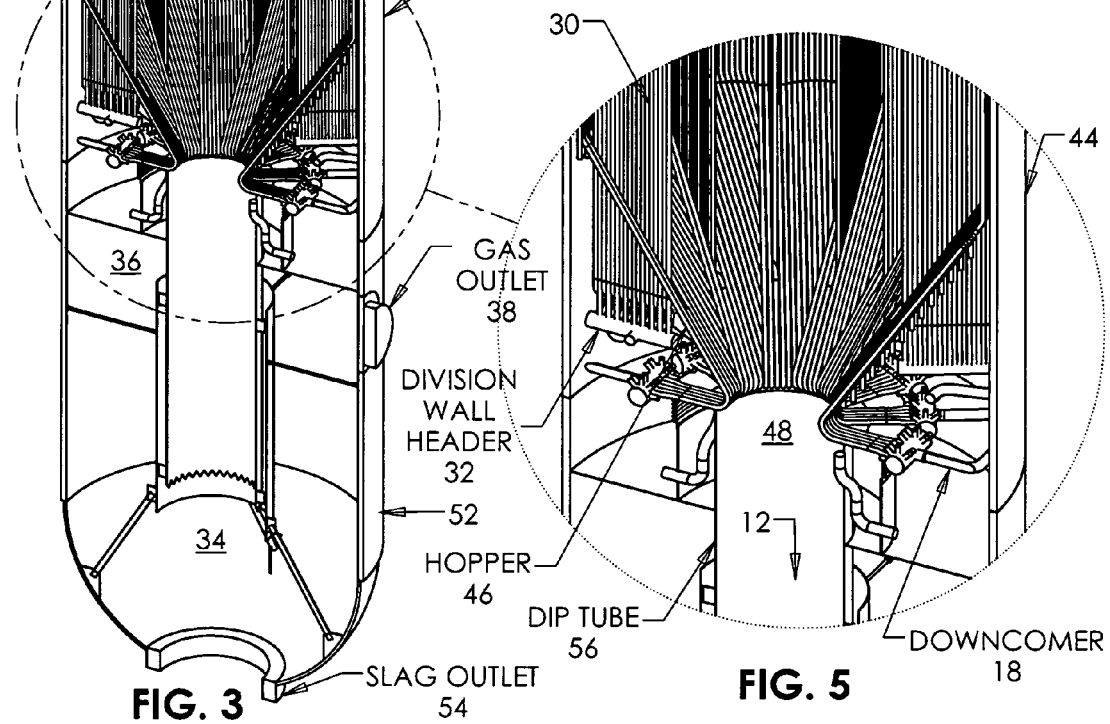
FIG. 3
FIG. 5

RADIANT SYNGAS COOLER

FIELD AND BACKGROUND OF THE INVENTION

The present invention relates generally to the field of coal gasification and, in particular, to a radiant synthesis gas (syngas) cooler for an Integrated Gasification Combined Cycle (IGCC) power plant. The radiant syngas cooler is used to contain and cool the synthesis gas produced by a coal gasification process used in the IGCC power plant.

IGCC power plants firing solid fuels have traditionally been higher capital cost and have had lower operating availability and reliability than competing solid fuel technologies such as pulverized coal combustion Rankine cycles. Primary components to be improved upon to make IGCC more competitive include uncooled gasifiers and radiant and convective synthesis gas coolers. Radiant synthesis gas cooler designs have a practical limitation of overall outside diameter due to the economics of pressure vessel containment and shipping size limitations to most power plant sites. Within these limits to vessel diameter, there is a need to maximize the compactness of the radiant heat transfer steam generating surface used to cool the gas to minimize the overall height of the radiant synthesis gas cooler.

U.S. Pat. No. 4,768,470 to Ziegler utilizes coaxial flues constructed of steam generating wall surface to shorten overall cooler height. This design provides for separate flues with independent water circuits to provide for individual lifting, removal and inspection of the inner and outer flues. Another design approach developed by The Babcock & Wilcox Company ca. 1992 utilizes a single flue of steam generating wall surface with additional steam generating surfaces ("wing walls") suspended inside the flue to maximize surface area and shorten cooler height. Other companies, such as GHH Mann employ similar designs.

Existing solutions still have not reduced the cost of this component to a competitive level. Single radiant cooler heights to cool synthesis gas for power plants using the largest commercial gas turbines can exceed 150 feet tall. Some plant designs have utilized two coolers, reducing overall height but further increasing costs. Additionally, redundant gasifiers, radiant coolers and convective coolers have been included in plant designs to improve plant operating availability, at a substantially higher cost.

Existing solutions for convective synthesis gas coolers require a separate component from the radiant cooler, with a cooled flue connecting the two components. Convective coolers designs include both water and steam tube designs (water or steam inside the tubes, gas outside) (Shell Oil Company) and fire tube designs (gas inside the tubes, water outside) (Steinmueller, others). Both of these designs require a pressure vessel enclosure and water/steam system, separate from the radiant cooler. Turbulence created in turns in the gas flue and at the inlet to the convective cooler has created a source of fuel ash fouling that can be difficult to manage.

Existing solutions for gasifiers include uncooled and cooled refractory enclosures. Uncooled enclosures (General Electric, Conoco, others) have experienced premature failures and frequent replacement. High availability with these designs typically requires a spare gasifier train, and/or firing the gas turbine on oil or gas at higher cost during repair time for the gasifier. Slow heat up and cool down times for thick refractory uncooled designs extend time during outages to repair or replace refractory. Existing cooled gasifier designs (Shell Oil Company, Future Energy) utilize separate water or steam generating circuits with a refractory coating to enclose and contain the gasifier gases. Some of these systems use low pressure, forced circulation cooling water systems that reject the heat outside of the power plant steam/water system, reducing efficiency. Prior art for containing hot solid fuel gases with molten slag in a combustion environment similar to this environment using steam generating surface integral with the downstream cooling circuitry includes Cyclone™ fired boilers (The Babcock & Wilcox Company).

It is thus clear that development of an economical, compact, reliable and robust synthesis gas cooler is critical to the future of IGCC systems at a commercial scale.

SUMMARY OF THE INVENTION

One aspect of the present invention is drawn to a synthesis gas cooler for extracting heat from synthesis gas produced by a gasification process. The synthesis gas cooler comprises a shell having a synthesis gas inlet and a synthesis gas outlet; a fluid-cooled flue contained within the shell for receiving the synthesis gas; fluid-cooled radiant heat transfer surface partially extending within the flue for cooling the synthesis gas; and means for conveying the synthesis gas from the outer flue to the outlet.

The various features of novelty which characterize the invention are pointed out with particularity in the claims annexed to and forming a part of this disclosure. For a better understanding of the invention, its operating advantages and the specific benefits attained by its uses, reference is made to the accompanying drawings and descriptive matter in which preferred embodiments of the invention are illustrated.

BRIEF DESCRIPTION OF THE DRAWINGS

In the Figures:

FIG. 3 is a perspective view, partly in section, of the radiant syngas cooler of FIG. 1;

FIG. 4 is a perspective view, partly in section, of an upper portion of the radiant syngas cooler of FIG. 3;

FIG. 5 is a perspective view, partly in section, of a lower portion of the radiant syngas cooler of FIG. 3;

DESCRIPTION OF THE PREFERRED EMBODIMENTS

Figures 1, 2:
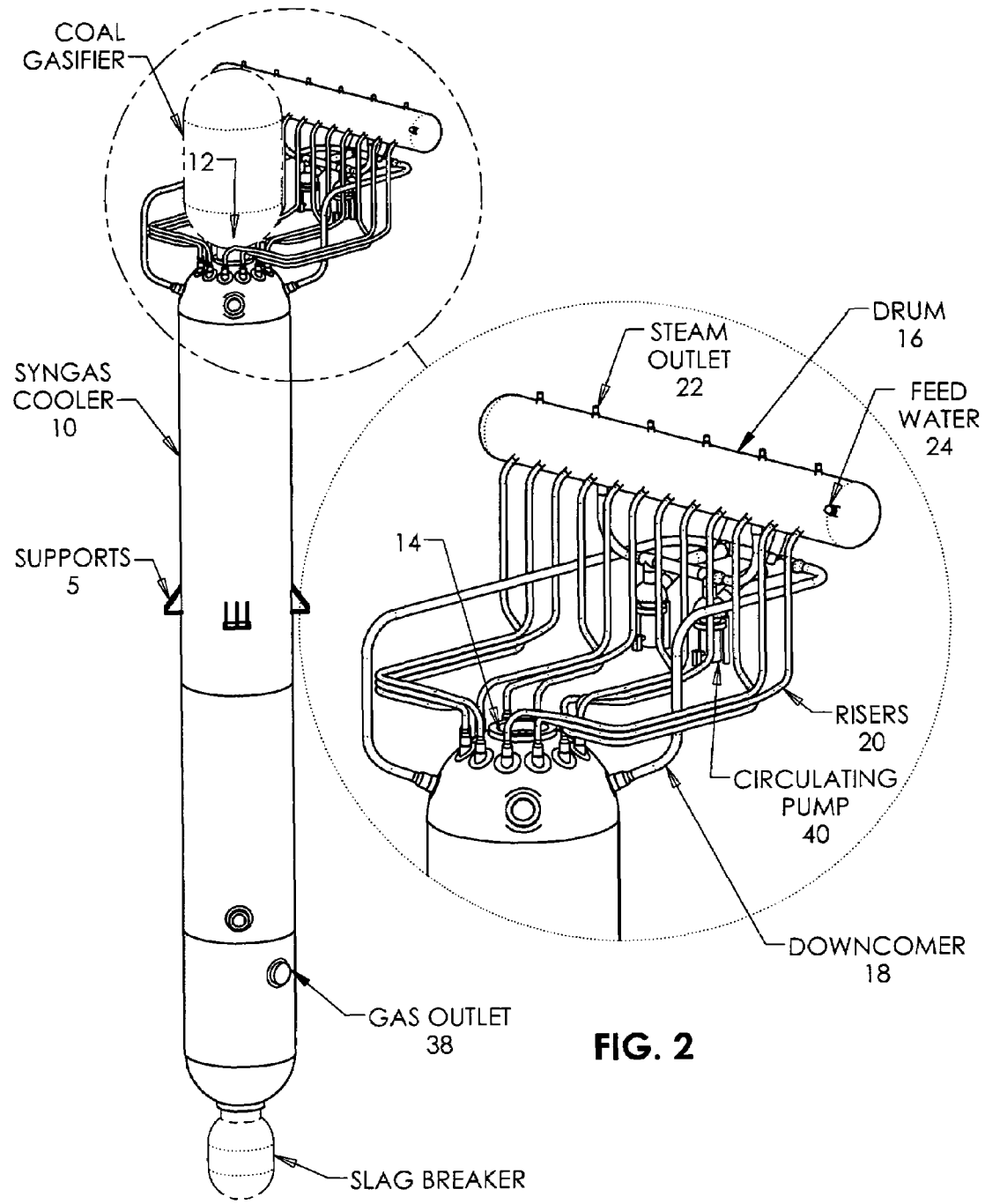
FIG. 1 is an outside perspective view of a radiant syngas cooler and selected auxiliary equipment according to a first embodiment of the present invention.
FIG. 2 is an outside perspective view of an upper portion of the radiant syngas cooler of FIG. 1.
Figure 6:
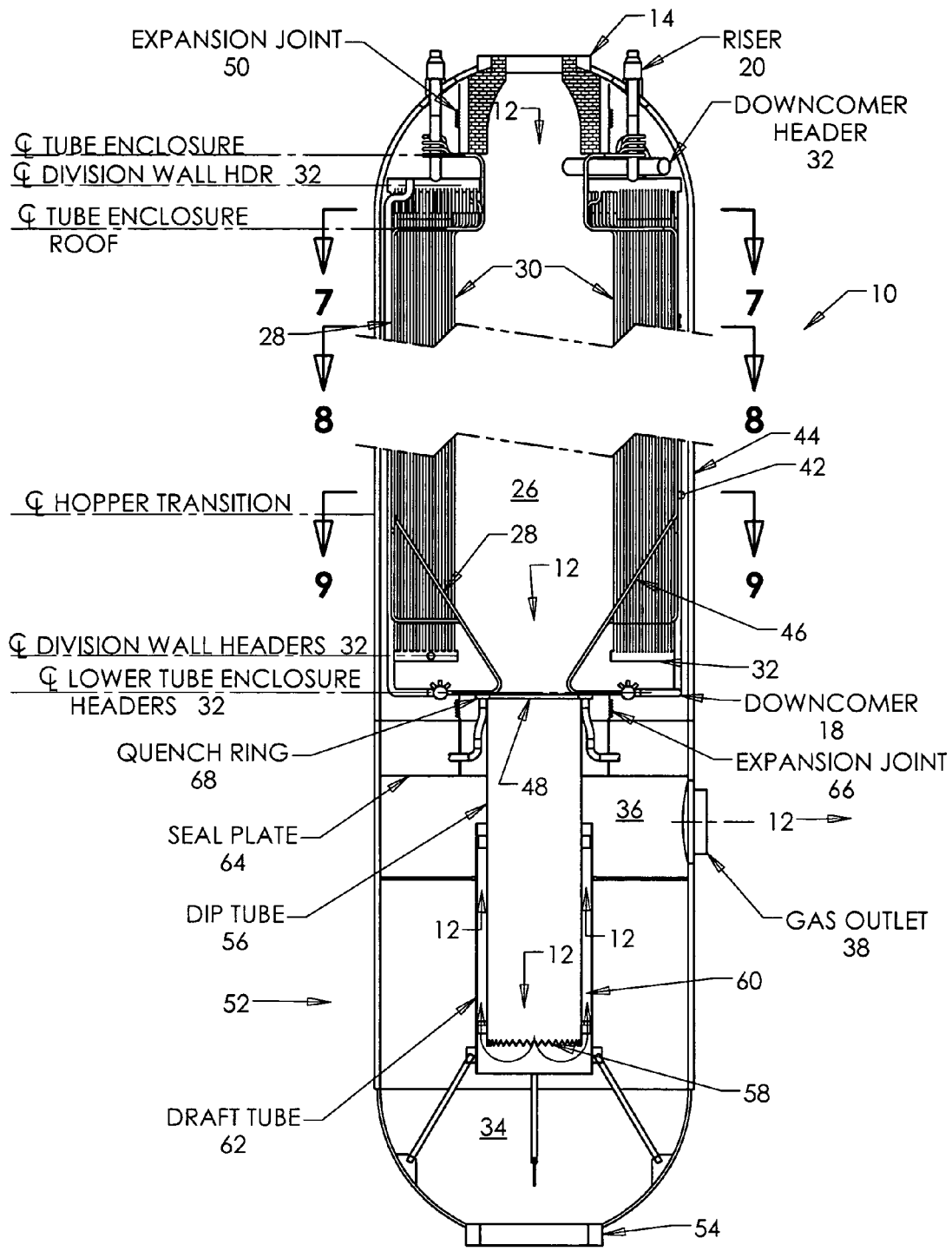
FIG. 6 is sectional side view of a first embodiment of the radiant syngas cooler according to the present invention.
Figure 7:
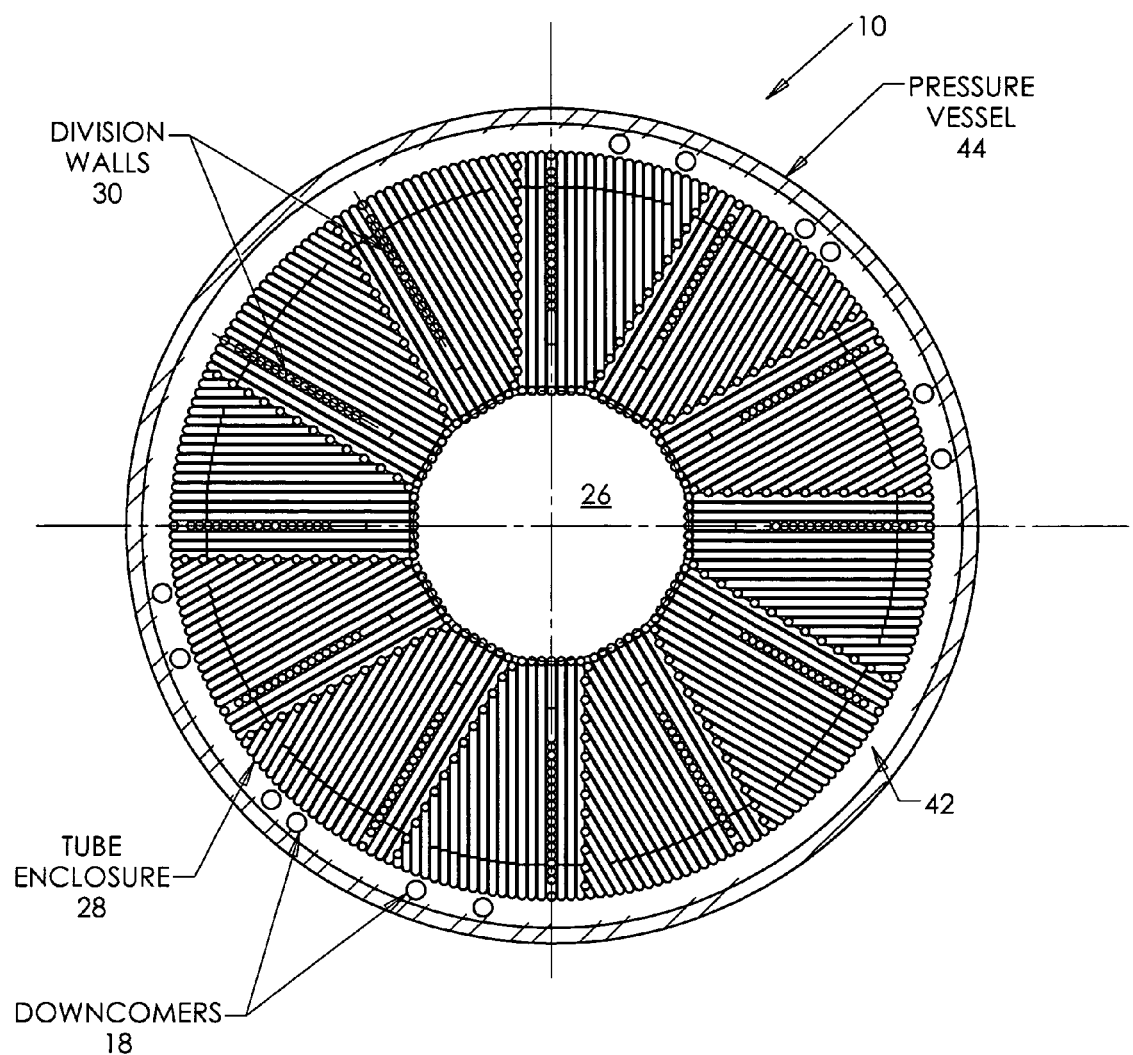
FIG. 7 is a sectional view of FIG. 6 viewed in the direction of arrows 7-7 of FIG. 6.
Figure 8:
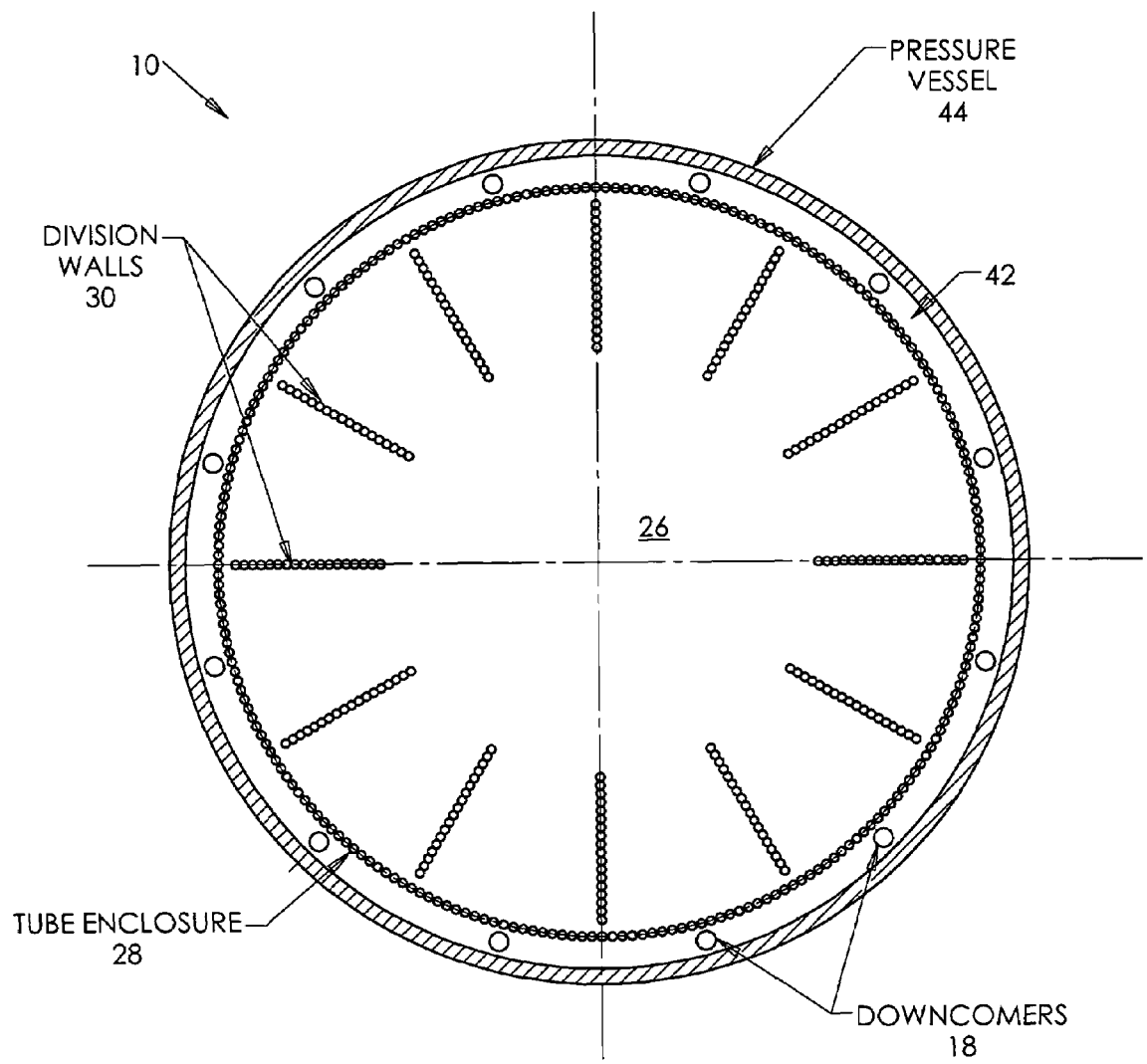
FIG. 8 is a sectional view of FIG. 6 viewed in the direction of arrows 8-8 of FIG. 6.
Figure 9:
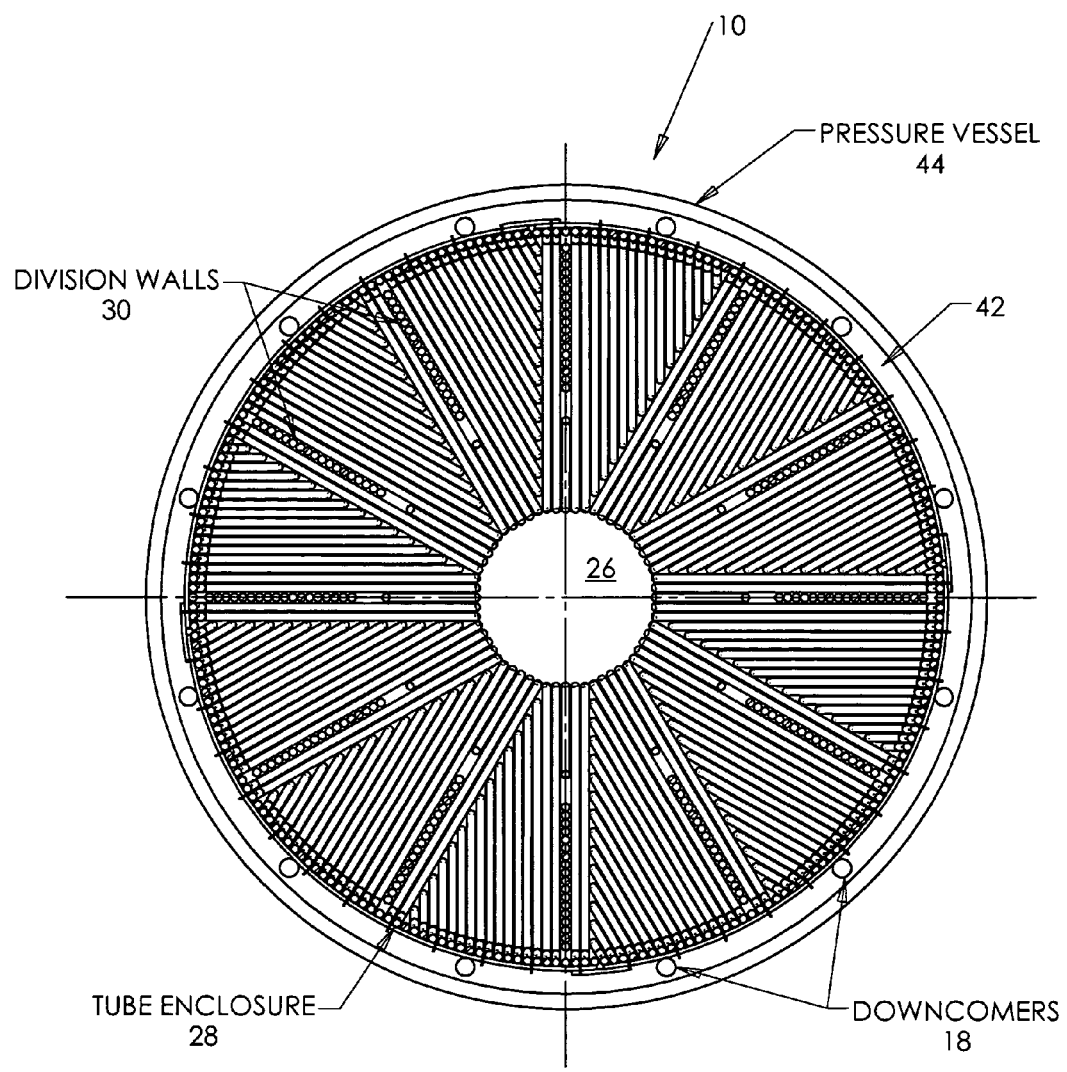
FIG. 9 is a sectional view of FIG. 6 viewed in the direction of arrows 9-9 of FIG. 6.

Before providing a description of the preferred embodiments of the present invention, a brief discussion of the various factors and design criteria for proper radiant syngas cooler design will be provided.

The primary function of a radiant syngas cooler is to cool hot synthesis gas produced by a gasification process. A robust, cost effective design is necessary. Determining the proper amount of heat transfer surface is thus an important first step because it is the primary driver for the entire product configuration. Given that the synthesis gas provided to the syngas cooler is at extremely high temperatures, radiation heat transfer phenomena predominates for a significant portion of the syngas cooler, but convective heat transfer effects cannot be ignored, especially as the synthesis gas is cooled to lower temperatures.

Heat Transfer Methods—Determining the heat absorption by the steam-water pressure parts is the single most important criteria to operational success. The gas temperature drop across the syngas cooler is directly related to the steam flow. Heat absorption is related to the synthesis gas properties at high pressure (emissivity in particular), entrained solids, and surface arrangement and cleanliness.

Unique Characteristics of Gasifier Synthesis Gas—The products of combustion in a gasification system are significantly different from those produced by normal boilers operating at atmospheric pressure and using air as an oxidant. These differences occur because:

Combustion is grossly incomplete; approximately 0.4 stoichiometry;
Large amounts of solids (ash, char) will be entrained;
Furnace operating pressure is high; and
Fuel oxidant is pure oxygen versus air.

The synthesis gases formed thus have greatly different properties from normal boiler flue gases. Synthesis gases are high in carbon monoxide, hydrogen and entrained solids, and low in nitrogen and oxygen. Non-negligible amounts of hydrogen sulfide are present, which is important for corrosion considerations. The synthesis gas density is relatively high because of the high gas side operating pressure. The synthesis gas molecular weight is relatively low because of the high hydrogen content. Taken together, the net effect is that the synthesis gases produced have fluid properties (specific heat, enthalpy, thermal conductivity, density, and emissivity) that differ markedly from normal boiler flue gas.

As a result of these different fluid properties, the thermal performance calculation procedure for synthesis gases deviates from an atmospheric pressure boiler in four major areas, as follows:

1. The convective heat transfer rate increases by 40 to 70%.
2. The radiation heat transfer rate increases.
3. The gas side draft loss is different.
4. The temperature response to a BTU of heat transfer is less. Specific heat and heat content increases, particularly because of the large hydrogen content (hydrogen has a specific heat of about 3.54 BTU/lb-F at 1000 F).

Of these four areas, the radiant heat transfer and the effects of entrained solids are the most significant in setting surface in the radiant syngas cooler. In addition, the highly reducing environment lowers the ash melting point temperatures as compared to oxidized combustion and this can affect the extent of slag covering on the enclosure walls.

Radiative Properties of Particle-Gas Mixtures—The prediction of radiative properties of particle and gas mixtures is a complex but essential step in the design of a radiant syngas cooler. Proprietary computer programs are required. These include programs such as the RPGT computer program for predicting gas properties based on the exponential wide band model from the University of Iowa, and the MIE computer program from IMB Corporation which is based on Mie Theory and which can be used for predicting spectral particle properties. Another proprietary computer program called the Radiative Properties of Particle-Gas Mixtures (RPPGM) program permits fast, efficient access to radiative gas properties and implements the results of the MIE computer program for particle properties.

The RPPGM program can be used in conjunction with another heat transfer program to predict overall furnace or cooler absorption. RPPGM predicts radiation properties for given mixtures of particles and gases. Traditionally, the definition of emissivity does not apply when a medium is partly scattering. Radiative intensity along a path is no longer a function of length, but is also dependent upon the radiation scattered from and into the direction of the path. However, for ideal conditions, an effective (adjusted) emissivity has been defined and is used in RPPGM, which attempts to include particle scattering. The assumption used to evaluate the effective emissivity are valid for moderately thick ($\beta L=1$) to optically thin media ($\beta L \rightarrow 0$), for radiative equilibrium or for cases which scattering is small. Here $\beta$ is the extinction coefficient and L is the beam length.

For the optically thick media typically encountered in gasifier applications ($\beta=5$ to 70), zone type methods, which use emissivity to calculate radiative heat transfer, are not suitable for calculating the effects of particle scattering. Flux type methods or ray tracing methods are then necessary to quantify radiative transfer accurately. The discrete ordinates method is one such approach, which is utilized in The Babcock & Wilcox Company's (B&W's) proprietary computational fluid dynamics (CFD) computer program, COMO™. This method uses radiative absorption and scattering coefficients instead of emissivity for gas-solid radiative transfer. These coefficients are also calculated by the RPPGM program and are more reliable for optically thick media.

Initial estimates of the required amount of heat transfer surface and predictions of the heat transfer surface performance can be approximated using an adjusted emissivity method. However, final heat transfer surface requirements should be based upon CFD modeling techniques and programs such as COMO™.

CFD Modeling of the Radiant Syngas Cooler—CFD models are typically based on a fundamental description of various interacting processes of turbulent flow, chemical reaction, and heat transfer. B&W's COMO™ computer program was specifically developed for the design and evaluation of combustion systems (boilers, furnaces, and burners), and has previously been used in the design of high-pressure, oxygen- and air-blown, entrained flow gasifiers. The COMO™ model is used for predicting the gas-side heat transfer performance of the radiant syngas cooler. Coal combustion is simulated with advanced models for coal devolatilization and char oxidation and gasification. Particle flow is predicted using a combination of numerical methods (Lagrangian for large particles, Eulerian for small particles) to predict particle aerodynamics, turbulent dispersion, and deposition on heat exchanger surfaces. Radiation heat transfer is solved in combination with turbulent flow, energy, and combustion. Predictions of gas-particle flow, temperature and heat flux are thus available for the design of the radiant syngas cooler.

Numerical modeling is the most accurate approach for predicting radiation transfer in the densely absorbing and scattering media that is ubiquitous in coal combustion and gasification systems. The COMO™ model uses the discrete ordinates method for numerical analysis of radiation in combustion systems, and incorporates the complex geometrical description of the combustor (cooler enclosure and division walls). Discrete ordinates was developed and optimized for thermal radiation in multi-dimensional geometries by the pioneering work at B&W. Since then, it has gained in popularity, and is now used in many other commercial CFD codes. The numerical solution for radiation leads to the distribution of radiant intensity and radiant heat flux for a given temperature field. The solution is coupled to equations for conservation of energy, and relationships for temperature and thermodynamic properties of gases and particles. Wall temperatures are determined from an energy balance for convection and radiation heat transfer to the surface, mass transfer, and heat conduction through the deposit-covered water-cooled surfaces. A numerical solution for radiation, gas and particle energy, gas and particle temperatures, and wall temperature will ultimately yield a converged solution in which an overall energy balance is achieved.

Combustion gases and entrained particles have a significant role in radiation heat transfer because they absorb, emit, and scatter radiation. Radiation properties of gases are accurately predicted based on fundamental models for spectral gas radiation. The exponential wide band model is used to calculate spectral absorption and emission properties of gas mixtures with $H_2O$, $CO_2$, $CO$, $CH_4$, $NO$ and $SO_2$, and non-participating gases $N_2$, $O_2$, and $H_2$. Mie theory is a general method for calculating radiation properties of spherical particles as a function of particle composition, concentration, diameter, and wavelength. These methods require reliable estimates or measurements of the composition, concentration, and particle size distribution of entrained particulate (char, ash and soot) entering the reactor. Radiation properties of the gases and particles are combined and conveniently expressed as total emission, absorption, and scattering efficiencies that depend on local variations in gas-particle composition, temperature and pressure. These properties are incorporated into the numerical method for radiation heat transfer. When particles other than soot are involved, particularly for the dense particle loading expected in the radiant syngas cooler, the effects of scattering cannot be neglected. Numerical methods which solve the general form of the radiative transport equation include the effects of both scattering and absorption.

The emissivity and thermal properties of ash deposits also have a large effect on heat transfer. The emissivity depends on the temperature, chemical composition, structure and porosity of the deposit layer, and whether the deposits are partially fused or molten. The thermal and radiative effects of coal-ash deposits can be included in the COMO™ model based on a combination of experimental measurements, and experience with boiler heat transfer performance. Because methods for predicting the effects of slag build up on heat transfer surfaces are partly empirical, they should be calibrated with field measurements of radiant syngas cooler performance at operating radiant syngas cooler units.

Heat Transfer Surface Setting—As described above, an adjusted emissivity method can be used to determine gas radiation heat transfer coefficients and empirical surface fouling factors to calculate the required amount of surface. Surface cleanliness plays an extremely important role in determining heat absorbed, and can be difficult to predict. Fouling factors are typically based on empirical values determined from experience with fuels, operating conditions and surface arrangement. Surface is set to absorb the specified heat input provided by the synthesis gas to be provided to the radiant syngas cooler under normal operating conditions. The heat transfer media is water. The water receives the heat from the synthesis gas and, based upon an assumed feedwater temperature and a given heat input will generate a steam flow according to known thermodynamic principles.

The heat transfer surface design should be based on achieving the required absorption without the use of sootblowers to clean the heat transfer surface of deposits which will accumulate during operation. Based upon experience at current gasification units, an equilibrium fouling and absorption rate is achieved over time. The present inventors have noted that such equilibrium conditions are also attained in industrial and utility boilers firing similar fuels, and the performance of such boilers is quite manageable. Experience indicates that due to slag buildup on sootblowers during service, penetration of corrosive gases, and breakdown of seal systems in-gas stream, removable sootblowers are unacceptable from a practical maintenance and availability standpoint. Wall blowers that do not project into the gas stream are effective for walls but are not typically used to blow outward onto surface like division walls, where most of the slagging occurs. Using this type of blower without access through the vessel wall would help solve some problems. However, extensive piping would be required in the inaccessible annulus and this piping would still be prone to attack by corrosion products.

To establish credible fouling factors, baseline calculations can be made from publicly available information on performance of the current radiant syngas coolers. It is well known that the heat transfer performance of these existing radiant syngas coolers has been much better than expected, due in large part to less than expected surface fouling. Surface configuration can be modeled and surface fouling factors back calculated to match performance; however, for full load coal-firing conditions, relatively low radiant cooler exit temperatures have resulted in relatively "clean" fouling factors when compared to the present inventors' experience with industrial and utility boilers. Recent experience with coal and petroleum coke mixtures at these units indicate "dirtier" fouling factors than achieved during "coal only" firing. It will thus be appreciated that the selection of appropriate fouling factors must be made based upon the fuels to be fired and, if available, actual field data.

Since fabrication of the radiant syngas cooler vessel will typically occur off-site, the vessel outer diameter is typically set to accommodate maximum shipping limitations. By expanding the tube enclosure out close to the outer wall of the pressure vessel and maximizing the use of internal division wall surface, an efficient design can be obtained. The height of the radiant syngas cooler is then set using appropriate surface fouling factors (as described above) and then solving the equations to determine the amount of heat transfer surface that will absorb that amount of heat necessary to achieve a desired exit synthesis gas temperature. The temperature of the synthesis gas decreases in non-linear fashion with distance from the radiant syngas cooler inlet. Declining radiation heat transfer driving force can be expected at the cooler exit, where significant additional radiant syngas cooler height would be needed to achieve only extremely modest reductions in synthesis gas temperature (e.g., for a given arrangement, an additional ten feet of radiant syngas cooler height may only be able to achieve an additional 50 F reduction of synthesis gas temperature). Increases in surface fouling factors would shift this relationship still further, and thus a more conservative assumption about fouling requires addition of substantial height and cost. Provision can be made for field addition of contingency surface, but it provides limited coverage due to declining effectiveness with height. It is evident that installation of more effective surface can achieve a proportionally shorter vessel.

Referring to the drawings generally, wherein like reference numerals designate the same or functionally similar elements throughout the several drawings, and to FIGS. 1 and 2 in particular, there are shown perspective views of a first embodiment of a radiant syngas cooler (RSC), generally designated 10, according to the present invention. The RSC 10 is typically a cylindrical vessel having its longitudinal axis oriented vertically. The RSC 10 is provided with hot synthesis gas 12 from a gasifier (shown in phantom in FIG. 1 and omitted for clarity in FIG. 2) at a synthesis gas inlet 14 provided at the top of the RSC 10. The RSC 10 is provided with supports 5 which transmit the load of the RSC 10 to adjacent support steel (not shown). As described later, the RSC 10 extracts heat from the synthesis gas 12 by means of fluid-cooled surfaces located within the RSC 10. These fluid-cooled surfaces are comprised of tubes and the working fluid within the tubes may be water, steam or a mixture thereof. A steam drum 16 is provided adjacent the upper portion of the RSC 10 and is in fluidic communication with the fluid-cooled surfaces within the RSC 10. More particularly, large pipes known as downcomers 18 are fluidically connected to the bottom portion of the drum 16 and convey subcooled water from the drum 16 to the fluid-cooled surfaces within the RSC 10. Heat extracted from the synthesis gas 12 causes the water in the fluid-cooled surfaces to become steam. Circulation is established through the difference in fluid density between the downcomers 18 and the heated fluid-cooled surfaces, thereby inducing the natural circulation process well known to those skilled in the art. In other words, the fluid-cooled flue and radiant heat transfer surfaces within the RSC 10 are designed so that the heat extracted from the synthesis gas 12 during normal operation of the synthesis gas cooler 10 is sufficient to induce natural circulation through the fluid-cooled flue and radiant heat transfer surfaces.

The lower density water/steam mixture is conveyed up through the fluid-cooled surfaces and then out of the RSC 10 via risers 20 back to the steam drum 16. Conventional steam/water separation devices (not shown) within the steam drum 16 are used to separate the water from the steam. The saturated steam exits from saturated steam outlet connections 22 on the top of the drum 16. The separated water is mixed with incoming feedwater supplied via a feedwater connection 24 and the process is repeated.

A full disclosure of steam drums specifically and boilers in general can be found in *Steam/its generation and use*, 41$^{st}$ Ed., Kitto & Stultz, Eds., ©2005 The Babcock & Wilcox Company, the text of which is hereby incorporated by reference as though fully set forth herein.

Referring to FIGS. 3, 4 and 5, there are shown perspective views, partly in section, of the RSC 10 of FIG. 1. The gas 12 enters a flue or enclosure region 26 provided within the RSC 10. The flue 26 is defined by an enclosure wall 28, preferably approximately cylindrical in shape, and comprised typically of fluid-cooled tubes which convey a working fluid which may be water, steam or a mixture thereof as indicated earlier. In addition to the fluid-cooled tubes forming the enclosure wall 28, the flue 26 is also provided with a plurality of radiant, fluid-cooled division wall surfaces or walls 30 (also referred to as fluid cooled radiant heat transfer surfaces) which are internally suspended within the RSC 10 so that a significant portion of the division wall surfaces 30 are exposed to the incoming synthesis gas 12, thereby heating the working fluid (again, water, steam or a mixture thereof) conveyed through the division walls 30.

The division walls 30 are generally constructed as a planar bank of tubes provided adjacent to one another, and may be provided with inlet and outlet manifolds or headers 32 which distribute or collect the working fluid conveyed through the division walls 30. The number and arrangement of the division walls 30 provided would be determined by heat transfer and cooling requirements as described above. Thus while FIGS. 3, 4 and 5 may suggest an arrangement of 12 division walls 30, arranged around the vertical longitudinal axis of the RSC 10, a greater or fewer number of division walls 30 may be provided to suit particular heat transfer and cooling requirements.

As the hot synthesis gas 12 flows down through the flue 26, it is cooled by the enclosure wall 28 and the division walls 30, and at a lower portion 52 of the RSC 10 the synthesis gas 12 is provided to a water bath region 34 and then turns upwardly substantially 180 degrees and is conveyed to a synthesis gas outlet region 36 before it is conveyed out of the RSC 10 via synthesis gas outlet 38.

Referring now to FIGS. 6, 7, 8 and 9 there is shown a first embodiment of the RSC 10 according to the present invention. As shown, the hot synthesis gas 12 enters through synthesis gas inlet 14 located at a top of the RSC 10. The hot synthesis gas 12 is conveyed downwardly through the flue 26 where the flue enclosure walls 28 and radiant heat transfer surface (division) walls 30 extract heat from the gas 12, reducing the latter's temperature. The bottom portion of the flue 26 is provided with hopper means 46, preferably frusto-conical in cross section and having a throat 48. The hopper means 46 collects slag particles and directs the hot synthesis gas 12 downwardly towards the water bath region 34 at the lower portion 52 of the RSC 10. The water bath region 34 is typically filled with water during operation, and serves to quench and humidify the hot synthesis gas 12 before it exits from the RSC 10 via synthesis gas outlet 38. The water bath region 34 is also for receiving and cooling solids entrained in the synthesis gas 12 and is provided with a solids outlet 54 for removing the solids from the RSC 10.

Means are also provided for conveying the synthesis gas 12 from the hopper means 46 to the water bath region 34, advantageously in the form of dip tube means 56 which extends from the throat 48 of the hopper means 46 to the water bath region 34. The lower or outlet end 58 of the dip tube means 56 is located proximate the water bath region 34 and is preferably below the surface of a water level established in the water bath region 34 during RSC 10 operation.

Quenching of the synthesis gas 12 is provided, patterned on traditional full quench systems. Means are thus provided for creating a passageway 60 for conveying the synthesis gas 12 from the outlet end 58 of the dip tube means 56 towards the synthesis gas outlet 38. Advantageously, the structure comprises draft tube means 62 located around the dip tube means 56 and since both structures are typically (but not always) cylindrical in form, the passageway 60 is typically an annular passageway 60. The dip tube means 56 and draft tube means 62 are submerged in a controlled level water bath during operation which cools and saturates the raw synthesis gas 12 at the bottom of the RSC 10 and provides a water bath for slag cooling and holding. In addition, an internal, submerged bath quench approach creates a unique, new gas seal requirement as compared to existing units to mitigate vessel shell corrosion and maintain integrity of the flue enclosure wall 28 during pressure transients.

In order to prevent the hot and corrosive synthesis gas 12 from getting "behind" the flue enclosure walls 28, seal plate means 64 are provided within the RSC 10 for preventing the synthesis gas 12 from entering an annular region 42 between the vessel shell 44 and the flue enclosure walls 28. The seal plate means 64 typically extends between the shell 44 and means for conveying the synthesis gas 12 from the hopper means 46 to the water bath region 34 (i.e., between the shell 44 and the dip tube means 56). Together the shell 44 and the seal plate means 64 partially define the synthesis gas outlet region 36. As described earlier, the synthesis gas outlet region 36 conveys synthesis gas 12 from the water bath region 34 to the synthesis gas outlet 38.

Expansion joint means 66 are provided for accommodating relative movement between the seal plate means 64 and the hopper means 46. Expansion joint means 50 for accommodating relative movement between the shell 44 and at least one of the fluid-cooled flue enclosure walls 28 and fluid-cooled radiant heat transfer surface 30 are also provided.

The hot synthesis gas is still at an elevated temperature upon exiting the throat region 48 of the hopper means 46, typically in the range of 1250 F. In order to cool and humidify the hot synthesis gas 12, quench means 68, advantageously in the form of at least a single quench ring 68, are provided for injecting fluid (e.g., water) into the synthesis gas 12. During operation of the RSC 10, hot synthesis gas 12 enters the dip tube 56 where it is partially quenched and the temperature is reduced from a typical 1250 F temperature to a lower temperature in the range of approximately 950 F. Single or multiple quench spray level elevations 68 can be employed.

Figure 10:
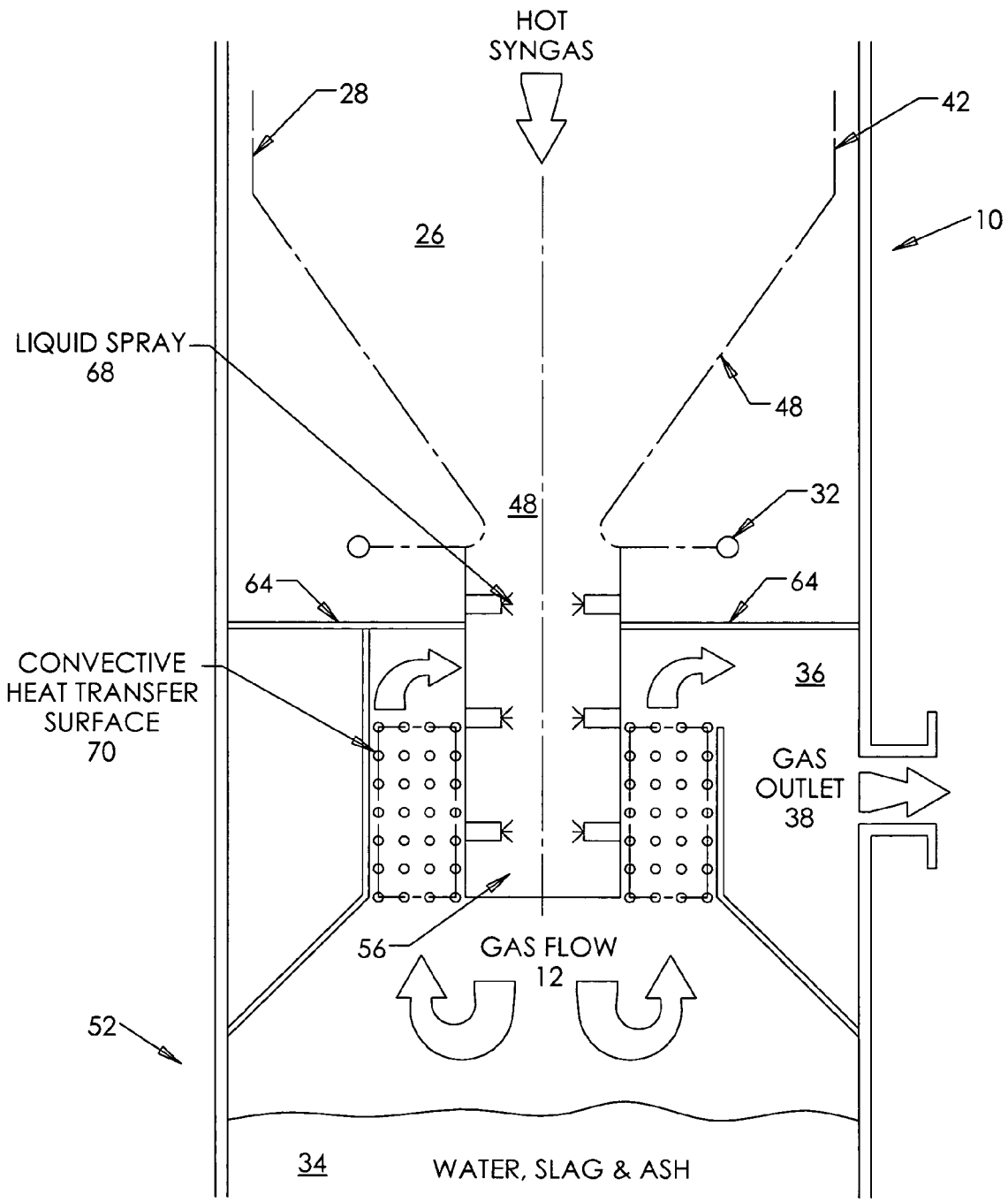
FIG. 10 is a partial sectional side view of a second embodiment of a radiant syngas cooler illustrating placement of convection heat transfer surface in a lower portion of the radiant syngas cooler according to the present invention.

As shown in FIG. 10, a second embodiment of the RSC 10 according to the present invention is disclosed, and which involves the placement of convection heat transfer surface 70 adjacent the dip tube means 56 in order to extract additional heat from the synthesis gas 12 prior to conveying the synthesis gas 12 through the synthesis gas outlet 38. Advantageously, the convection heat transfer surface 70 comprises one or more banks of tubes arranged so that the synthesis gas 12 flows over the outside of the tubes. This convection heating surface 70 can be water or steam cooled. The banks of convection heating surface 70 may be provided anywhere around the perimeter of the dip tube means 56 and the tubes may be in any orientation. The convection heating surface 70 may employ the same fluidic circuitry (an integrated cooling approach) as is employed in the steam generating surface comprising the flue walls 28 and radiant heat transfer surfaces 30, thus eliminating the need for a separate cooling system. Alternatively, a separate fluidic circuit may be employed for the convection heating surface 70. The main objective is to transfer heat from the synthesis gas 12 so that the ash has a reduced tendency to stick to the tubes and cause deposition and plugging. With a direct spray quench system 68 upstream in the dip tube means 56, the synthesis gas 12 temperature can be reduced at the bottom of the RSC 10 below levels where convection cooler inlet plugging has traditionally been problematic. The quench system 68 can also be designed to promote solids dropout. Placing surface in this region to meet specified heat absorption reduces heat transfer surface cost and risk. Displacing 15%-20% of the specified radiant heat transfer duty could reduce radiant surface and vessel height by as much as 40%. Convective surface 70 would be steam-water cooled, and is compact and cost effective in the required temperature range of approximately 700 F to 1000 F. Additional heat absorption beyond that typically considered achievable in a radiant cooler may be feasible, enhancing overall plant efficiency. Convective surface 70 also acts as a buffer against swings in RSC 10 outlet gas 12 temperature, reducing sensitivity of the design to surface fouling in the RSC 10.

Tube Wall Construction and Metal Temperatures—In a preferred embodiment, the tubes forming the enclosure wall 28 are of membrane construction with 2" OD tubes of relatively thin wall thickness and narrow spacing. Tube diameter and spacing are set based on maximum metal temperatures to avoid corrosion with high chrome/nickel alloy material, which has a thermal conductivity approximately ⅓ that of carbon steel. The greatly reduced conductivity yields high tube OD and membrane temperatures. The upset spot absorption rate is set at 100,000 $BTU/ft^2$ hr based on an average expected absorption rate in the highest temperature zone of 68,000 $BTU/ft^2$ hr. For a 2" diameter tube operating at relatively high steam pressure, the maximum outside tube and membrane temperatures are approaching 800 F. The membrane width chosen is a minimum which can be manufactured with conventional membrane weld techniques. The tube ID and water saturation temperatures are desired to be higher than existing units to improve steam cycle efficiency. Scale up from existing unit steam operating pressure tightens the margin for corrosion protection based on minimizing the tube temperature.

The design of the division walls 30 preferably incorporates loose tube construction with each panel approximately 3 feet wide using 2" OD tubes. There is a small gap between the tube enclosure wall 28 and the division walls 30. The division walls 30 receive heat on two sides and the absorption is thus twice that of the tube enclosure wall 28. The maximum tube OD temperature is not significantly affected by the higher absorption and is similar to the enclosure wall 28 tubes. At minimum membrane widths, the membrane temperature is unacceptably high from receiving heat on two sides. Tangent tube construction and full weld between the tubes to form a tangent tube panel may also be considered, as well as a full length weld of the division wall 30 to the enclosure wall 28.

Circulation System Design—The circulation system must accommodate fast ramp rates of heat input during start-up. The steam drum 16 diameter and length are established based upon steam flow and drum swell requirements. Once the flue 26 tube enclosure wall 28 and division wall 30 tube sizes and quantities are set by the surface arrangement, water flow areas are calculated, a circulation ratio is established and connection sizes are set to provide acceptable water velocity, percent saturated water head, top steam quality and stability in all circuits. Natural circulation is preferred due to its self-regulating capability and reduced operating costs since there are no pumps to operate and maintain. However, as will be observed in FIG. 2, the possibility of employing circulating pumps 40 is considered. In addition, under certain circumstances there may be a need for a smaller circulation pump for startup that is shut off and isolated when the heat input is steady. During startup, steam from an outside source is introduced to the steam drum to raise pressure and temperature of the pressure parts during the gasifier temperature rise. Once the gasifier temperature is sufficient to ignite the coal, it is necessary that the pressure parts are uniformly warmed from circulated water. Because the heat to raise pressure is introduced at the top of the circulation circuit, there is no driving force for water to circulate, hence the possible need to either introduce the steam at the bottom of the circulation circuit or to add small circulation pumps to force circulation. Once circulation is established, the instantaneous ignition of coal at a high heat input can be safely accommodated and the start-up circulation pump shutdown and isolated.

The drum 16 location and connection design is set to accommodate circulation and a reasonable placement of this equipment in the steel surrounding the RSC 10. At the top of the RSC 10, downcomer pipes 18 from the drum 16 enter the top of the RSC 10 vessel and extend to the bottom of the RSC 10 through the annulus 42 created between the vessel wall 44 and the tube enclosure wall 28. This arrangement simplifies vessel connections and supply routing.

Additionally, a steam warm-up system in the steam drum 16 (not shown) may be provided to preheat the entire steam-water system prior to gasifier light-off, using the circulation pumps 40 to heat the setting.

Syngas Sealing—The primary gas seals required to protect the RSC 10 vessel wall 44 and the pressure parts not in direct contact with raw syngas 12 are at the gas inlet 14, at the enclosure wall 28 roof and at the gas outlet 38 downstream of the quench system 68. At the gas inlet 14, hot gas bypassing behind the refractory and overheating of the vessel 44 at this highly stressed area must be prevented. This is accomplished by encasing the refractory neck 78 above the pressure parts with a gas tight metallic expansion joint 50 and pressurizing the inside with nitrogen and/or clean recycle syngas. At the roof, a gas tight construction through direct pressure part closure and/or use of closure plates above the pressure parts away from the radiation from the furnace is employed. At the gas outlet 38, a tight closure plate from vessel wall 44 to dip tube means 56 is provided, with a metallic expansion joint 66 to accommodate relative movement between the walls 28 and vessel wall 44. A tight seal prevents saturated syngas 12 from contacting the pressure parts and vessel above the cladded area.

Figure 11:
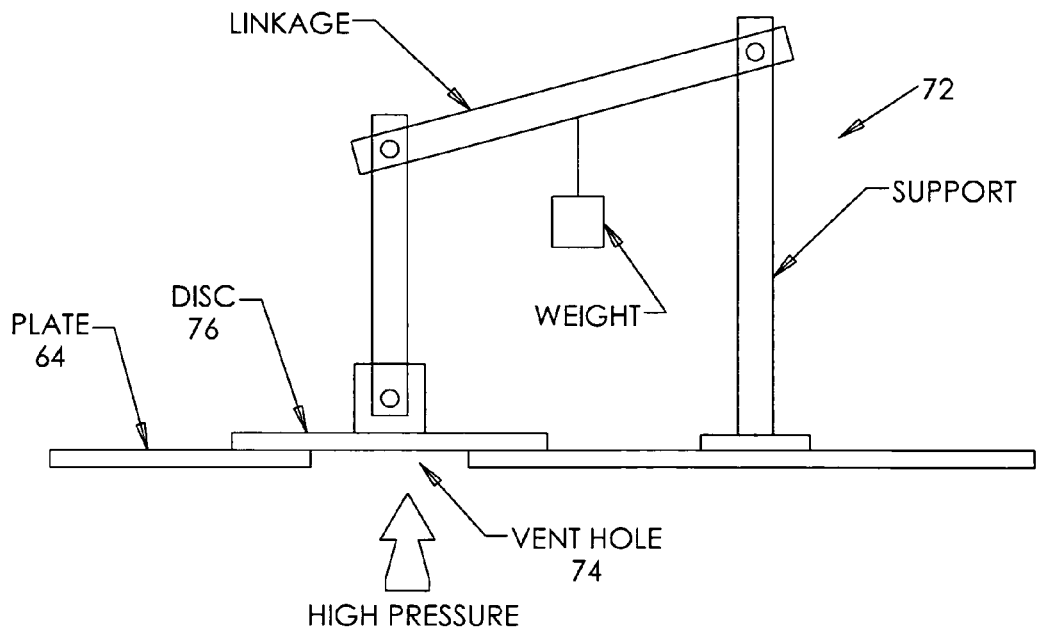
FIG. 11 is an illustration of a first embodiment of a pressure relief means comprising a relief damper assembly usable in connection with the radiant syngas cooler according to the present invention.
Figure 12:
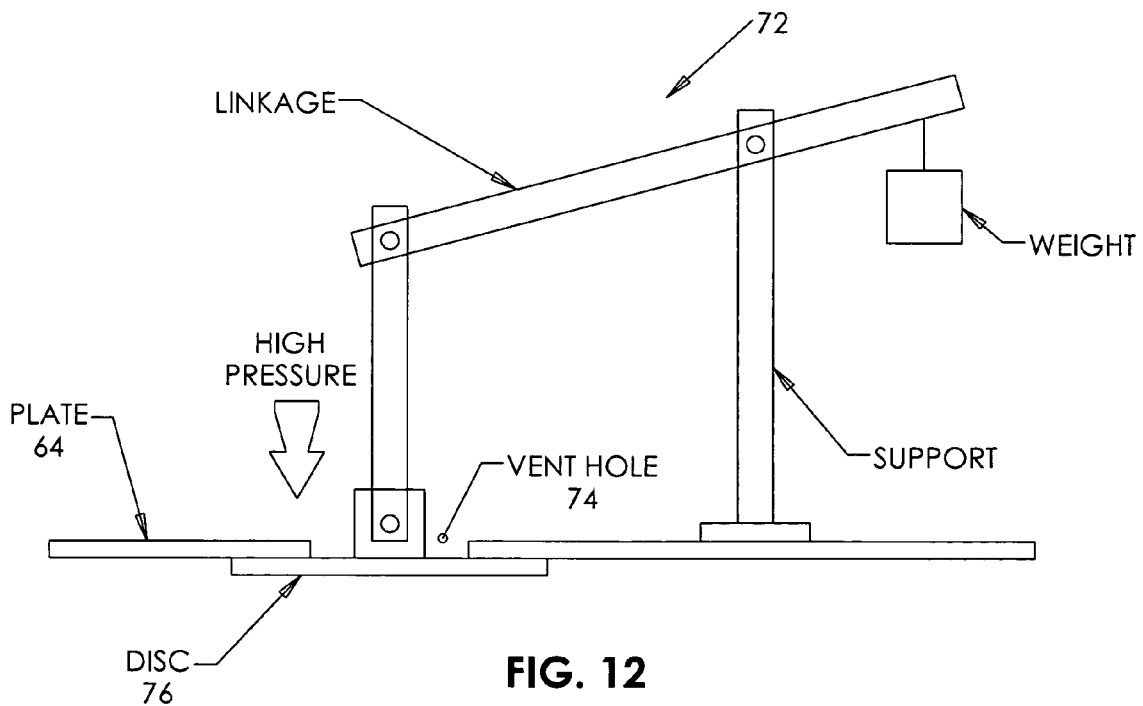
FIG. 12 is an illustration of a second embodiment of a pressure relief means comprising a relief damper assembly usable in connection with the radiant syngas cooler according to the present invention.
Figure 13:
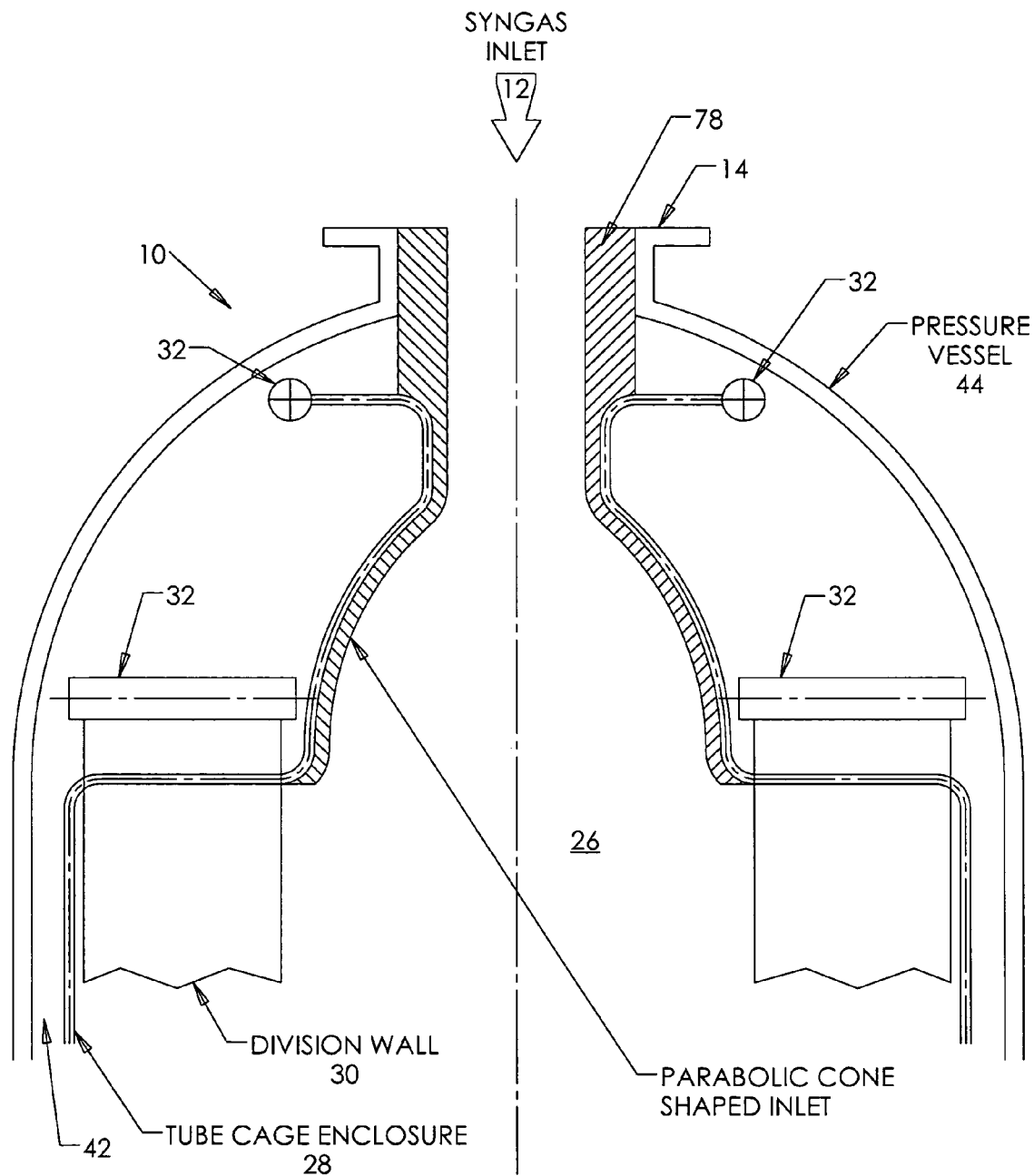
FIG. 13 is a partial sectional side view of an upper portion of a radiant syngas cooler employing an alternate embodiment for the synthesis gas inlet according to the present invention.
Figure 14:
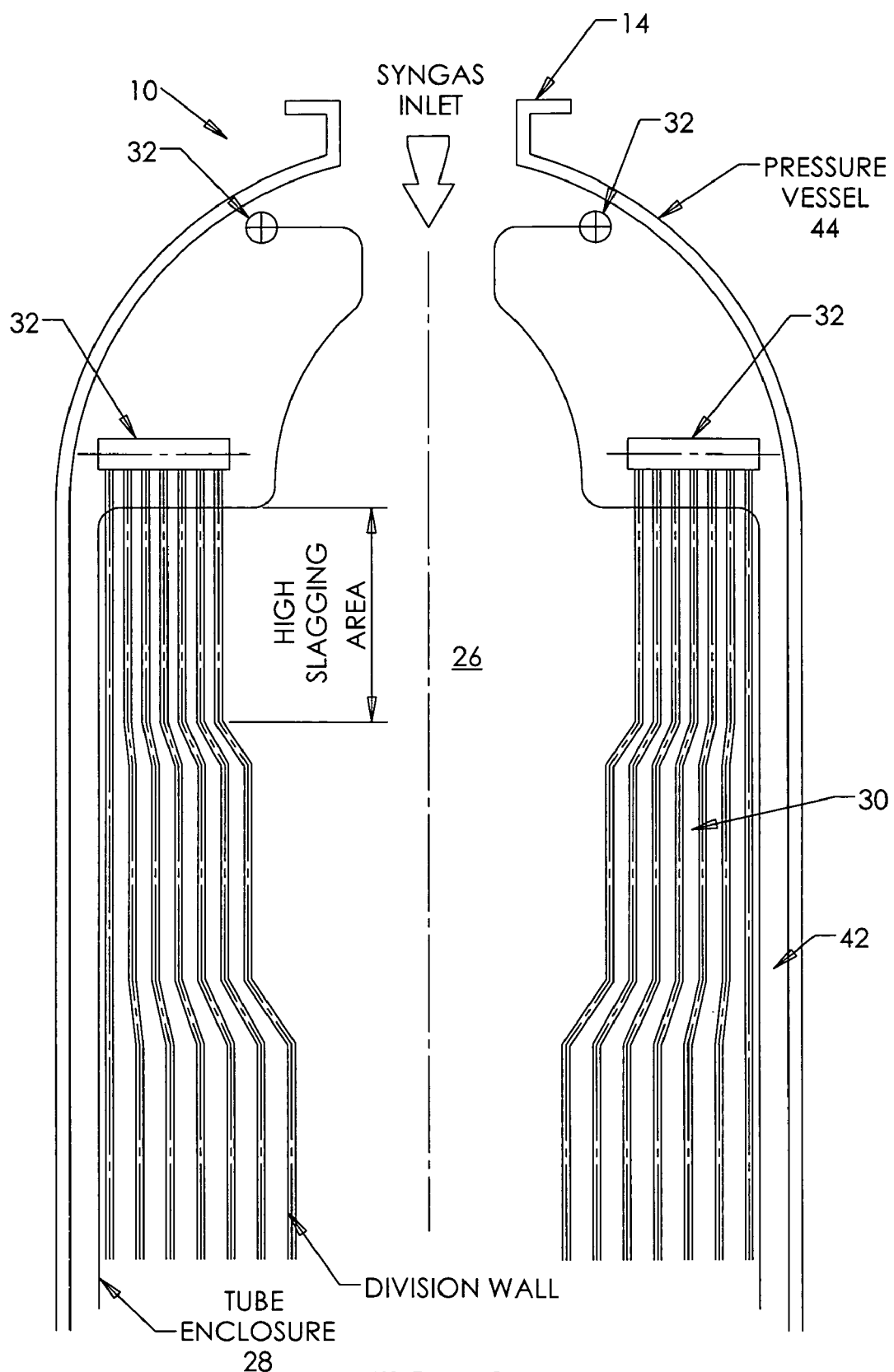
FIG. 14 is a partial sectional side view of an upper portion of a radiant syngas cooler employing an alternate embodiment for the radiant heat transfer surface usable in connection with the radiant syngas cooler according to the present invention.

Tight syngas seals are preferred in the region of the RSC 10 outlet 38 to keep raw syngas 12 from contacting areas of the pressure vessel and heat transfer pressure parts that are not designed with materials to resist corrosion. There are open spaces between the flue enclosure wall 28 and vessel wall 44 that are purged with nitrogen or clean, recycled (non-corrosive) syngas under normal operating conditions to keep raw syngas out. The gasification process introduces significant pressure transients during upset conditions that would subject the seal to extreme pressure differences and cause failure of the seal, or even the pressure parts in a worst case. The seal approach described above must also allow for pressure relief of raw synthetic gas 12 during positive or negative synthetic gas 12 transients to prevent damage to the flue enclosure wall 28. Accordingly, and as shown in FIGS. 11 and 12, another aspect of the present invention involves provision of pressure relief devices or relief damper assemblies, generally designated 72, in the synthesis gas outlet region to vent to both the annulus 42 and the lower flue enclosure wall 28. The pressure relief means 72 are provided in the seal plate means 64 for reducing the possibility of damage to the seal plate means 64 which could occur due to a pressure on one side of the seal plate means 64 being greater than a pressure on an opposite side of the seal plate means 64.

Preferably the pressure relief means 72 comprises at least one vent hole or aperture 74 in the seal plate means 64 and means for obstructing flow 76, such as a disc, through the aperture 74 until the pressure on one or the other side of the seal plate means 64 exceeds a pressure setpoint value at which point the flow obstructing means 76 will permit flow through the aperture 74 until the pressure no longer exceeds the pressure setpoint value. The damper assembly 72 could also have a weight counterbalance to provide damper lifting at a specified pressure difference. At this location, the synthetic gas 12 temperature is low enough to permit use of non-metallic materials around the sealing surface of the damper to provide a tight seal and allow for some non-uniformity in the damper surface that can occur over a period of time in service.

Reduce Fabrication Cost/Improve Panel Welding—Significant attention to weld quality is critical when fabricating and welding with expensive and difficult-to-work-with high chrome/nickel tube alloys. It is envisioned that laser welding of the boiler tube wall panels employed in the RSC 10, according to the methods as described in U.S. Pat. No. 6,852,945 to Harth, III, can provide significant cost reduction potential, the text of which is hereby incorporated by reference as though fully set forth herein. This technique reduces the need for expensive alloy weld wire to just that needed for making conventional manual panel welds, and reduces labor man hours in panel fabrication. It also offers a stronger and lower heat input panel weld, with obvious advantages, especially in the fabrication of the membrane to tube welds. Automatic panel welding can be used for the vertical cage tube panel sections of the radiant syngas cooler, and potentially for the division wall panels. Base metal sensitization will be minimized by laser welding to a degree that is unachievable with submerged arc welding. With heat inputs of 3 to 5 kilojoules per centimeter, the heat affected zone is much smaller and it penetrates less into the tube wall.

Optimize Heat Transfer Surface—The diameter, height and weight of the vessel are primary cost drivers across all project costs: raw material, fabrication, transportation and erection. Mitigating the surface fouling risk requires maximizing surface cleanliness and installing more surface in a given volume.

Maximize Surface Cleanliness—The key to optimizing surface effectiveness is minimizing the accumulation of molten slag on division walls 30 in the upper region of the RSC 10. The temperature driving force is greatest at the top but molten ash significantly reduces heat transfer, and gas temperature is not safely below the ash fusion point at equilibrium until nearly half way down the height of the cooler.

Accordingly, another embodiment of the present invention involves the use of an appropriate contour of the refractory at the synthesis gas inlet 14 to control gas expansion exiting the inlet 14. In particular, a parabolic (or other favorable) cone-shaped inlet is provided at a top portion of the RSC 10 for admitting the synthesis gas 12 into the RSC 10 such that solids entrained within the synthesis gas 12 are preferentially directed downwardly in order to reduce direct impact of the entrained solids on the fluid-cooled radiant heat transfer surface 30. This allows the particle laden synthesis gas 12 to expand within the cone and reduce the potential for flow induced vortices. This should minimize the outward flow of molten ash particles and keep the division walls 30 cleaner.

Another embodiment of the present invention involves means to reduce slagging potential by moving the leading edge of division walls 30 further from the longitudinal vertical centerline of the RSC 10. This will require, in most instances, a greater quantity of reduced-depth division walls 30. The radiant heat transfer surface 30 furthest from the centerline is the cleanest; thus moving more of the division wall surface 30 towards the flue walls 28 should make this surface cleaner and more effective. The concept is to contain the molten ash flow more axially and move the division walls 30 further outboard. This combination increases the potential for cleaner surfaces compared to existing units, even in the slag zone. Thus, the fluid-cooled radiant heat transfer surface 30 partially extending within the flue 26 for cooling the synthesis gas 12 is located so as to reduce direct impact of the synthesis gas 12 and solids entrained therein onto the fluid-cooled radiant heat transfer surface 30.

Enhance Surface/Volume Efficiency—Enlarging the flue 26 diameter by removing the downcomer supply pipes in the annulus 42 would provide an opportunity to increase in surface. This advanced design concept would require connecting downcomer pipes 18 entering at the top of the vessel to a ring header just above the tube wall 28 perimeter. A portion of the tubes 28 would be connected to the ring header, with water flow down a portion of the wall tubes 28 into a collection header at the bottom of the wall tubes 28 as a heated downcomer 18 system. The remaining wall tubes 28 and the division wall tubes 30 would connect a lower supply ring header with water flow back up to a riser 20 header and on to the steam drum 16. This construction may also offer advantages in simplifying top support of the wall 28 and division wall 30 assemblies. Thus, another embodiment may employ heated downcomer means 18 and which form part of the fluid-cooled walls 28, the downcomer means 18 being supplied from and supported by a common ring header located at an upper portion of the RSC 10. Experience has shown that heated downcomer circuits are safe and effective when the water exiting the circuit is sufficiently sub-cooled to provide a water boiling point 10 feet or more above the inlet header. Success with this design is driven by the combination of circulation ratio and the amount by which the entering feedwater is sub-cooled below saturation temperature.

Another embodiment of the present invention involves contouring the division wall profile to match the pattern of reduced slagging from top to bottom. Each division wall is made about 17% deeper beginning at the midpoint of the cooler by expanding the membrane width between each tube. This region is cooler and less slag-prone, and maximum membrane temperatures can be controlled at larger widths. Each division wall 30 is further expanded about 17% over the last one fourth of the height using incrementally wider membrane. Thus, the one or more planar division wall surfaces 30 have a varying shape in order to reduce slag deposition thereon. Portions of the division wall surfaces 30 which are closer to the synthesis gas inlet 14 are radially further away from a longitudinal axis of the RSC 10, and portions of the division wall surfaces 30 which are closer to the hopper means 46 are radially closer to the longitudinal axis of the RSC 10. Alternatively, the division wall surfaces 30 are provided with a membrane wall construction and the varying shape of the division wall surfaces 30 is provided by varying a width of the membrane in between adjacent tubes forming the division walls 30.

With this combination of increased flue 26 diameter and contoured division walls 30, the amount of installed heat transfer surface is increased approximately 40%. The area increase is achieved using flat membrane bar, which is much less expensive than tubes. The distance from the gas inlet to the leading edge tube of 24 in. deep division walls 30 will be approximately 38 in. Even without taking credit for cleaner surfaces in the slag covered area, the overall height requirement can be significantly decreased.

The use of composite tubes in place of solid high chrome/nickel alloy tubes could offer several cost and risk advantages. Composite tubes would be made of an outer layer of high chrome/nickel alloy over a base tube of Croloy material. As used herein, Croloy is a trademark for metallic tubes, particularly those generally referred to by those skilled in the art as the chromium and molybdenum steels. They fall under the A.S.T.M. designation A 213/A 213 M, or the A.S.M.E designation SA 213, and come in various grades such as T2 (Croloy ½), T5, T9, T11 (Croloy 1¼), T12, and T22 (Croloy 2¼). The composite tubes envisioned in this application would likely be 2½ in. OD, larger than the 2 in. OD with solid high chrome/nickel alloy. Thinner high chrome/nickel alloy material over a conductive base material would lower tube and membrane maximum temperatures, allowing wider membrane in the enclosure and allow for membrane construction of division walls in the high heat flux zone. The larger tube OD and membrane widths would require fewer tubes overall. The higher conductivity would provide more operating temperature margin below maximum allowable metal temperatures. Having Croloy material on the tube ID would also reduce feedwater quality requirements and lower capital and operating cost of feedwater treatment.

While specific embodiments of the invention have been shown and described in detail to illustrate the application of the principles of the invention, those skilled in the art will appreciate that changes may be made in the form of the invention covered by the following claims without departing from such principles. In some embodiments of the invention, certain features of the invention may sometimes be used to advantage without a corresponding use of the other features. Accordingly, all such changes and embodiments properly fall within the scope of the following claims.

We claim:

1. A synthesis gas cooler for extracting heat from synthesis gas produced by a gasification process, comprising:
    a shell having a synthesis gas inlet and a synthesis gas outlet;
    a fluid-cooled flue contained within the shell for receiving synthesis gas;
    fluid-cooled radiant heat transfer surface partially extending within the flue for cooling the synthesis gas;
    means for conveying the synthesis gas from the flue to the synthesis gas outlet;
    quench means for injecting fluid into the synthesis gas;
    seal plate means within the synthesis gas cooler for preventing synthesis gas from entering a region between the shell and the flue; and
    pressure relief means provided in the seal plate means for reducing the possibility of damage to the seal plate means which could occur due to a pressure on one side of the seal plate means being greater than a pressure on an opposite side of the seal plate means.

2. The synthesis gas cooler according to claim 1, comprising a water bath region at a lower portion of the synthesis gas cooler for receiving and cooling solids entrained in the synthesis gas and a solids outlet for removing the solids from the synthesis gas cooler.

3. The synthesis gas cooler according to claim 1, wherein the fluid-cooled flue is comprised of an enclosure wall made of fluid-cooled tubes.

4. The synthesis gas cooler according to claim 1, wherein the fluid-cooled radiant heat transfer surface is comprised of one or more fluid-cooled, division wall surfaces internally suspended within the synthesis gas cooler so that a significant portion of the division wall surfaces are exposed to the incoming synthesis gas.

5. The synthesis gas cooler according to claim 4, wherein each of the one or more division wall surfaces are comprised of a planar bank of tubes provided adjacent to one another.

6. The synthesis gas cooler according to claim 1, wherein a bottom portion of the flue comprises a hopper.

7. The synthesis gas cooler according to claim 6, further comprising means for conveying the synthesis gas from the hopper to a water bath region of the synthesis gas cooler.

8. The synthesis gas cooler according to claim 7, wherein the means for conveying the synthesis gas from the hopper to the water bath region comprises dip tube means having an outlet proximate the water bath region.

9. The synthesis gas cooler according to claim 8, further comprising means for creating a passageway for conveying the synthesis gas from the outlet of the dip tube means towards the synthesis gas outlet.

10. The synthesis gas cooler according to claim 9, wherein the means for creating a passageway for conveying the synthesis gas from the outlet of the dip tube means towards the synthesis gas outlet comprises draft tube means around the dip tube means.

11. The synthesis gas cooler according to claim 8, further comprising convection heat transfer surface located adjacent the dip tube means extracts additional heat from the synthesis gas prior to conveying the synthesis gas through the synthesis gas outlet.

12. The synthesis gas cooler according to claim 11, wherein the convection heat transfer surface comprises one or more banks of tubes arranged so that the synthesis gas flows over the outside of the tubes.

13. The synthesis gas cooler according to claim 8, wherein the quench means is located within the dip tube means.

14. The synthesis gas cooler according to claim 7, comprising seal plate means within the synthesis gas cooler for preventing synthesis gas from entering a region between the shell and the flue.

15. The synthesis gas cooler according to claim 14, wherein the seal plate means extends between the shell and means for conveying the synthesis gas from the hopper to the water bath region.

16. The synthesis gas cooler according to claim 15, comprising expansion joint means for accommodating relative movement between the seal plate means and the hopper.

17. The synthesis gas cooler according to claim 14, wherein the shell and the seal plate means partially define a synthesis gas outlet region.

18. The synthesis gas cooler according to claim 17, wherein the synthesis gas outlet region conveys synthesis gas from the water bath region to the synthesis gas outlet.

19. The synthesis gas cooler according to claim 7, wherein the hopper has a frustoconical shape and a throat region adjacent the means for conveying the synthesis gas towards the water bath region.

20. The synthesis gas cooler according to claim 1, comprising downcomer means for supplying fluid to the fluid-cooled flue and radiant heat transfer surface, and riser means for conveying the fluid therefrom.

21. The synthesis gas cooler according to claim 20, wherein some of the downcomer means are heated, forming part of the fluid-cooled flue walls, the downcomer means being supplied from and supported by a common ring header located at an upper portion of the synthesis gas cooler.

22. The synthesis gas cooler according to claim 1, wherein the fluid-cooled flue and radiant heat transfer surfaces are comprised of composite tubes.

23. The synthesis gas cooler according to claim 22, wherein the composite tubes have an outer layer of high chrome/nickel alloy over a base tube of Croloy material.

24. A synthesis gas cooler for extracting heat from synthesis gas produced by a gasification process, comprising:
a shell having a synthesis gas inlet and a synthesis gas outlet;
a fluid-cooled flue contained within the shell for receiving synthesis gas;
fluid-cooled radiant heat transfer surface partially extending within the flue for cooling the synthesis gas;
means for conveying the synthesis gas from the flue to the synthesis gas outlet;
expansion joint means for accommodating relative movement between the shell and at least one of the fluid-cooled flue enclosure walls and fluid-cooled radiant heat transfer surface;
wherein the fluid-cooled flue and radiant heat transfer surfaces are designed so that the heat extracted from the synthesis gas during normal operation of the synthesis gas cooler is sufficient to induce natural circulation through the fluid-cooled flue and radiant heat transfer surfaces.

25. A synthesis gas cooler for extracting heat from synthesis gas produced by a gasification process, comprising:
a shell having a synthesis gas inlet and a synthesis gas outlet;
a fluid-cooled flue contained within the shell for receiving synthesis gas;
fluid-cooled radiant heat transfer surface partially extending within the flue for cooling the synthesis gas;
means for conveying the synthesis gas from the flue to the synthesis gas outlet;
seal plate means within the synthesis gas cooler for preventing synthesis gas from entering a region between the shell and the flue; and
pressure relief means provided in the seal plate means for reducing the possibility of damage to the seal plate means which could occur due to a pressure on one side of the seal plate means being greater than a pressure on an opposite side of the seal plate means.

26. The synthesis gas cooler according to claim 25, wherein the pressure relief means comprises at least one aperture in the seal plate means and means for obstructing flow through the aperture until the pressure on one or the other side of the seal plate means exceeds a pressure setpoint value at which point the flow obstructing means will permit flow through the aperture until the pressure no longer exceeds the pressure setpoint value.

27. A synthesis gas cooler for extracting heat from synthesis gas produced by a gasification process, comprising:
a shell having a synthesis gas inlet and a synthesis gas outlet;
a fluid-cooled flue contained within the shell for receiving synthesis gas;
fluid-cooled radiant heat transfer surface partially extending within the flue for cooling the synthesis gas;
means for conveying the synthesis gas from the flue to the synthesis gas outlet; and
a parabolic coneshaped inlet at a top portion of the synthesis gas cooler for admitting the synthesis gas into the synthesis gas cooler such that solids entrained within the synthesis gas are preferentially directed downwardly in order to reduce direct impact of the entrained solids on the fluid-cooled radiant heat transfer surface.

28. The synthesis gas cooler according to claim 27, wherein the fluid-cooled radiant heat transfer surface partially extending within the flue for cooling the synthesis gas is located so as to reduce direct impact of the synthesis gas and solids entrained therein onto the fluid-cooled radiant heat transfer surface.

29. A synthesis gas cooler for extracting heat from synthesis gas produced by a gasification process, comprising:
a shell having a synthesis gas inlet and a synthesis gas outlet;
a fluid-cooled flue contained within the shell for receiving synthesis gas;

fluid-cooled radiant heat transfer surface partially extending within the flue for cooling the synthesis gas; and means for conveying the synthesis gas from the flue to the synthesis gas outlet;

wherein the fluid-cooled radiant heat transfer surface comprises one or more fluid-cooled, division wall surfaces internally suspended within the synthesis gas cooler so that a significant portion of the division wall surfaces are exposed to the incoming synthesis gas, and wherein each of the one or more division wall surfaces are comprised of a planar bank of tubes provided adjacent to one another; and wherein a bottom portion of the flue comprises a hopper and the one or more planar division wall surfaces have a varying shape in order to reduce slag deposition thereon, portions of the division wall surfaces which are closer to the synthesis gas inlet being radially further away from a longitudinal axis of the synthesis gas cooler, and portions of the division wall surfaces which are closer to the hopper being radially closer to the longitudinal axis.

30. The synthesis gas cooler according to claim 29, wherein the division wall surfaces are provided with a membrane wall construction and the varying shape of the division wall shape is provided by varying a width of the membrane in between adjacent tubes.

* * * * *